United States Patent
Xu

(10) Patent No.: US 11,929,610 B2
(45) Date of Patent: Mar. 12, 2024

(54) ELECTROSTATIC DISCHARGE (ESD) PROTECTION CIRCUIT, INTEGRATED CIRCUIT, AND ELECTROSTATIC DISCHARGE METHOD

(71) Applicant: CHANGXIN MEMORY TECHNOLOGIES, INC., Hefei (CN)

(72) Inventor: Qian Xu, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 316 days.

(21) Appl. No.: 17/464,686

(22) Filed: Sep. 2, 2021

(65) Prior Publication Data

US 2022/0140598 A1 May 5, 2022

Related U.S. Application Data

(63) Continuation of application No. PCT/CN2021/107392, filed on Jul. 20, 2021.

(30) Foreign Application Priority Data

Nov. 5, 2020 (CN) .......................... 202011225663.5

(51) Int. Cl.
  *H02H 9/04* (2006.01)
  *H02H 1/00* (2006.01)
(52) U.S. Cl.
  CPC .......... *H02H 9/045* (2013.01); *H02H 1/0007* (2013.01)
(58) Field of Classification Search
  CPC ............................. H02H 9/045; H02H 1/0007

USPC ........................................................... 361/56
See application file for complete search history.

(56) References Cited

U.S. PATENT DOCUMENTS

| | | | |
|---|---|---|---|
| 6,552,886 B1 | 4/2003 | Wu et al. | |
| 2008/0297960 A1 | 12/2008 | Chen | |
| 2013/0182359 A1* | 7/2013 | Jeon | H02H 9/044 361/56 |
| 2015/0162746 A1* | 6/2015 | Ikeda | H02H 9/046 361/56 |

(Continued)

FOREIGN PATENT DOCUMENTS

| CN | 101060754 A | 10/2007 |
|---|---|---|
| CN | 101902039 A | 12/2010 |

(Continued)

*Primary Examiner* — Yemane Mehari
(74) *Attorney, Agent, or Firm* — Kilpatrick Townsend & Stockton LLP

(57) ABSTRACT

Embodiments provide an electrostatic discharge (ESD) protection circuit and an electrostatic discharge method. The ESD protection circuit includes: a pulse detection unit (100), a discharge transistor (300), a feedback delay unit (200), and a processing unit (400). A first terminal of the pulse detection unit (100) is connected to a first pad (101), a second terminal of the pulse detection unit (100) is connected to a second pad (102), and an output terminal of the pulse detection unit (100) is configured to output a detection result signal. A gate of the discharge transistor (300) is connected to the output terminal of the pulse detection unit (100), a drain of the discharge transistor (300) is connected to the first pad (101), and a source of the discharge transistor (300) is connected to the second pad (102). The feedback delay unit (200) includes a PMOS transistor (Mp) and an NMOS transistor (Mn).

15 Claims, 2 Drawing Sheets

(56) References Cited

U.S. PATENT DOCUMENTS

2015/0288173 A1   10/2015   Chen et al.
2015/0295399 A1*  10/2015   Wang ..................... H02H 9/045
                                            361/56

FOREIGN PATENT DOCUMENTS

| | | |
|---|---|---|
| CN | 103001200 A | 3/2013 |
| CN | 104362606 A | 2/2015 |
| CN | 104701312 A | 6/2015 |
| CN | 105470938 A | 4/2016 |
| CN | 105680433 A | 6/2016 |
| CN | 108512208 A | 9/2018 |
| CN | 108565848 A | 9/2018 |
| CN | 108682673 A | 10/2018 |
| CN | 109524949 A | 3/2019 |
| CN | 211238251 U | 8/2020 |

\* cited by examiner

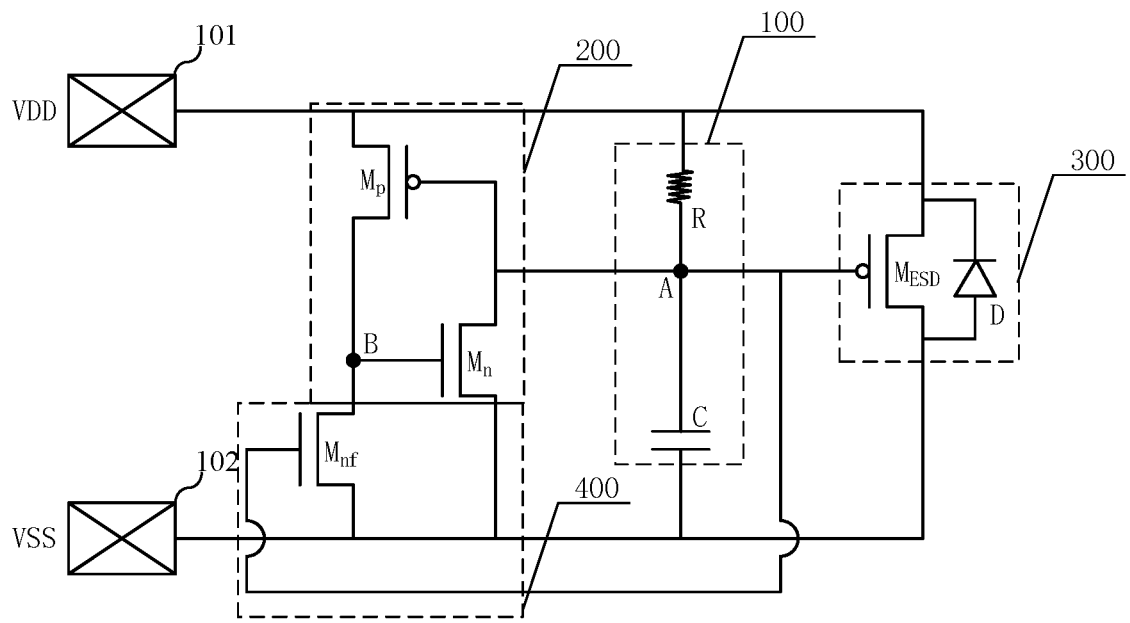

FIG. 3

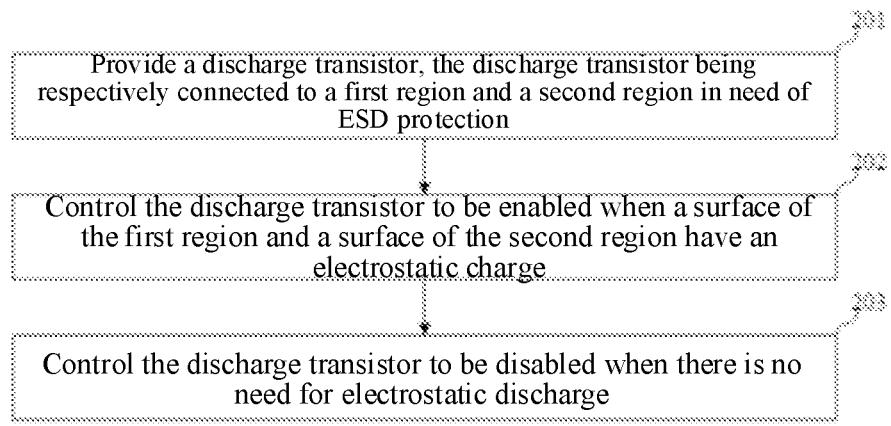

Provide a discharge transistor, the discharge transistor being respectively connected to a first region and a second region in need of ESD protection Control the discharge transistor to be enabled when a surface of the first region and a surface of the second region have an electrostatic charge Control the discharge transistor to be disabled when there is no need for electrostatic discharge

FIG. 4

ELECTROSTATIC DISCHARGE (ESD) PROTECTION CIRCUIT, INTEGRATED CIRCUIT, AND ELECTROSTATIC DISCHARGE METHOD

CROSS-REFERENCE TO RELATED APPLICATION

This application is a continuation of PCT/CN2021/107392, filed on Jul. 20, 2021, which claims the priority to the Chinese Patent Application No. 202011225663.5 titled "ELECTROSTATIC DISCHARGE (ESD) PROTECTION CIRCUIT, INTEGRATED CIRCUIT, AND ELECTROSTATIC DISCHARGE METHOD", and filed on Nov. 5, 2020, which is incorporated herein by reference in its entirety.

TECHNICAL FIELD

The present disclosure relates to, but is not limited to, an electrostatic discharge (ESD) protection circuit, an integrated circuit, and an electrostatic discharge method.

BACKGROUND

An electrostatic discharge (ESD) protection circuit is configured to provide a low-impedance current path to discharge electrostatic charges. Generally, main design considerations for the existing ESD protection include a layout area, a start-up current, a leakage current from VDD to Vss, and mechanisms for avoiding false triggering in operation.

At present, there frequently occurs a problem of incomplete discharge of the electrostatic charges. In this case, the ESD protection circuit has a poor electrostatic protection effect. The electrostatic charges remained on pads may still likely act on functional circuits and damage the functional circuits protected by the ESD protection circuit, which has a seriously adverse effect on service life of an integrated circuit.

SUMMARY

An embodiment of the present disclosure provides an electrostatic discharge (ESD) protection circuit. The ESD protection circuit includes: a pulse detection unit, a discharge transistor, a feedback delay unit, and a processing unit. A first terminal of the pulse detection unit is connected to a first pad, a second terminal of the pulse detection unit is connected to a second pad, and an output terminal of the pulse detection unit is configured to output a detection result signal. A gate of the discharge transistor is connected to the output terminal of the pulse detection unit, a drain of the discharge transistor is connected to the first pad, and a source of the discharge transistor is connected to the second pad. The discharge transistor is configured to enable a conduction between the source and the drain to discharge electrostatic charges. The feedback delay unit is configured to extend an on period of the discharge transistor for discharging electrostatic charges. The feedback delay unit includes a P-channel metal oxide semiconductor (PMOS) transistor and an N-channel metal oxide semiconductor (NMOS) transistor. A source of the PMOS transistor is connected to the first pad, and a gate of the PMOS transistor is connected to the output terminal of the pulse detection unit. A source of the NMOS transistor is connected to the second pad, a drain of the NMOS transistor is connected to the output terminal of the pulse detection unit, and a gate of the NMOS transistor is connected to a drain of the PMOS transistor. The processing unit is respectively connected to the output terminal of the pulse detection unit and the feedback delay unit, and the processing unit is configured to control to enable or disable the feedback delay unit according to a detection result signal.

The embodiments of the present disclosure also provide an integrated circuit, which includes the above ESD protection circuit configured to discharge static electricity of pads on the integrated circuit.

The embodiments of the present disclosure also provide an electrostatic discharge method, which is configured for electrostatic discharge by means of the above electrostatic discharge method. The electrostatic discharge method includes following steps: providing a discharge transistor, the discharge transistor being respectively connected to a first region and a second region in need of electrostatic discharge protection; controlling the discharge transistor to be enabled when a surface of the first region and a surface of the second region have an electrostatic charge; and controlling the discharge transistor to be disabled when there is no need for electrostatic discharge.

BRIEF DESCRIPTION OF THE DRAWINGS

FIG. 3 is another schematic diagram of an ESD protection circuit according to an embodiment of the present disclosure; and FIG. 4 is a schematic flow diagram of steps of an electrostatic discharge method according to another embodiment of the present disclosure.

DETAILED DESCRIPTION

Figure 1:
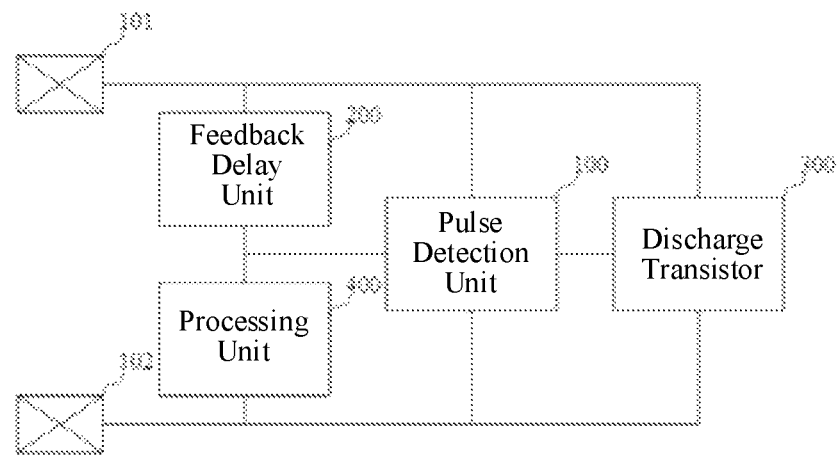
FIG. 1 is a schematic diagram showing a connection relationship of an electrostatic discharge (ESD) protection circuit according to an embodiment of the present disclosure.

Research has found that a reason why electrostatic discharge of a pad is not thorough enough resides in that when a discharge transistor of an electrostatic discharge (ESD) protection circuit discharges electrostatic charges, the discharge transistor should be kept in an ON state. However, discharge time of the existing discharge transistor is not long enough, which directly causes a consequence that the electrostatic charges on a surface of the pad cannot be discharged completely when the discharge transistor of the ESD protection circuit discharges the electrostatic charges.

It is found that an on period of the discharge transistor of the ESD protection circuit may be extended by increasing an RC time constant. However, if the RC time constant is too large, a required capacitor or resistor may be caused to increase, which directly leads to increase in size of the capacitor or resistor, thereby having a negative effect on layout design of an integrated circuit.

In one example, a time constant of the RC time constant is related to a product of a resistance of the resistor and a capacitance of the capacitor in a pulse detection unit in the ESD protection circuit. It is necessary to arrange a large enough capacitor or resistor, such that the discharge transistor has a long enough on period. However, a large enough capacitor or resistor has a large size, which takes up layout space of the integrated circuit. For example, if the time constant of the pulse detection unit is set as 0.1 to 1 μs, it is required to arrange a 50 Kohm N+ diffused resistor and a 20 pF NMOS capacitor on a surface of a circuit board, which may occupy larger layout space and also make the ESD protection circuit susceptible to noise.

An embodiment of the present disclosure provides an electrostatic discharge (ESD) protection circuit. The ESD protection circuit includes: a pulse detection unit, a discharge transistor, a feedback delay unit, and a processing unit. A first terminal of the pulse detection unit is connected to a first pad, a second terminal of the pulse detection unit is connected to a second pad, and an output terminal of the pulse detection unit is configured to output a detection result signal. A gate of the discharge transistor is connected to the output terminal of the pulse detection unit, a drain of the discharge transistor is connected to the first pad, and a source of the discharge transistor is connected to the second pad. The discharge transistor is configured to enable a conduction between the source and the drain to discharge electrostatic charges. The feedback delay unit is configured to extend an on period of the discharge transistor for discharging electrostatic charges. The feedback delay unit includes a P-channel metal oxide semiconductor (PMOS) transistor and an N-channel metal oxide semiconductor (NMOS) transistor. A source of the PMOS transistor is connected to the first pad, and a gate of the PMOS transistor is connected to the output terminal of the pulse detection unit. A source of the NMOS transistor is connected to the second pad, a drain of the NMOS transistor is connected to the output terminal of the pulse detection unit, and a gate of the NMOS transistor is connected to a drain of the PMOS transistor. The processing unit is respectively connected to the output terminal of the pulse detection unit and the feedback delay unit, and the processing unit is configured to control to enable or disable the feedback delay unit according to a detection result signal.

A person of ordinary skill in the art may understand that in each embodiment of the present disclosure, many technical details are put forward such that a reader may better understand the present disclosure. However, the technical solutions requested to be protected by the present disclosure may also be implemented even without these technical details or various variations and modifications based on the following embodiments.

Figure 2:
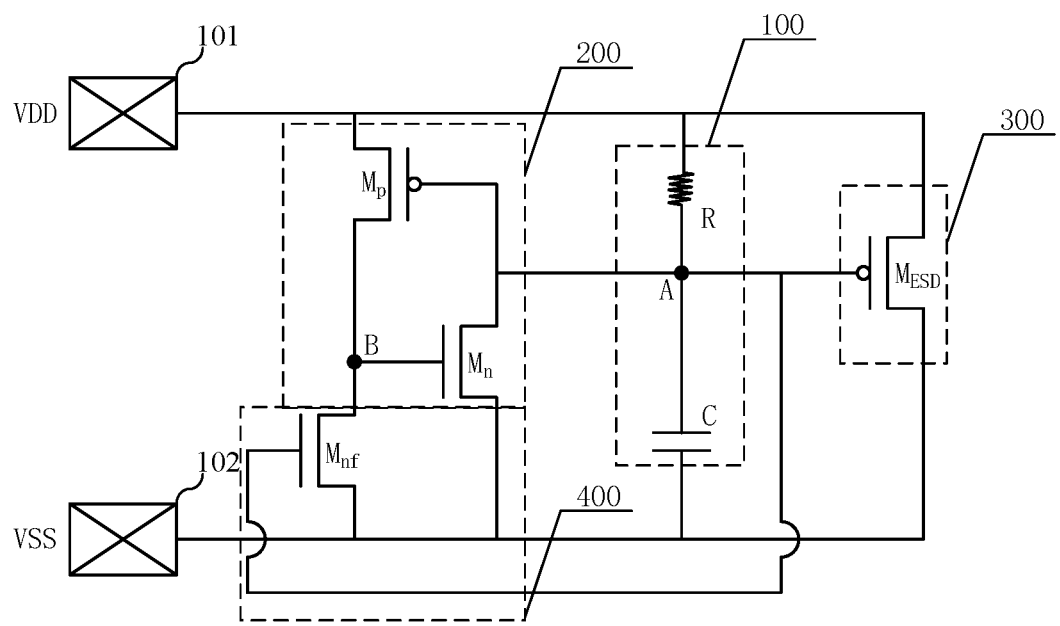
FIG. 2 is a schematic circuit diagram of an ESD protection circuit according to an embodiment of the present disclosure.

FIG. 1 is a schematic diagram showing a connection relationship of the ESD protection circuit according to this embodiment of the present disclosure, FIG. 2 is a schematic circuit diagram of the ESD protection circuit according to this embodiment of the present disclosure, and FIG. 3 is another schematic diagram of the ESD protection circuit according to this embodiment of the present disclosure. The ESD protection circuit provided by this embodiment of the present disclosure is further described in detail as below with reference to the accompanying drawings.

Referring to FIG. 1, the ESD protection circuit includes:

a pulse detection unit 100, configured to detect an electrostatic pulse, a first terminal of the pulse detection unit 100 being connected to a first pad 101, a second terminal of the pulse detection unit 100 being connected to a second pad 102, and an output terminal of the pulse detection unit 100 being configured to output a detection result signal;

a discharge transistor 300, a gate of the discharge transistor 300 being connected to the output terminal of the pulse detection unit 100, a drain of the discharge transistor 300 being connected to the first pad 101, a source of the discharge transistor 300 being connected to the second pad 102, and the discharge transistor 300 being configured to discharge an electrostatic charge when an ESD event occurs in the first pad 101 or the second pad 102;

a feedback delay unit 200, configured to extend an on period of the discharge transistor 300 when the discharge transistor 300 discharges the electrostatic charge; and a processing unit 400, respectively connected to the output terminal of the pulse detection unit 100 and the feedback delay unit 200, the processing unit 400 being configured to control ON and OFF of the feedback delay unit 200 according to the detection result signal.

Referring to FIG. 2, the feedback delay unit 200 includes a PMOS transistor Mp, wherein a source of the PMOS transistor Mp is connected to the first pad 101, and a gate of the PMOS transistor Mp is connected to the output terminal of the pulse detection unit 100; and an NMOS transistor Mn, wherein a source of the NMOS transistor Mn is connected to the second pad 102, a drain of the NMOS transistor Mn is connected to the output terminal of the pulse detection unit 100, and a gate of the NMOS transistor Mn is connected to a drain of the PMOS transistor Mp.

In some embodiments, the discharge transistor 300 is a P-type MOS transistor MESD, wherein a gate of the MESD is connected to the output terminal of the pulse detection unit 100, a drain of the MESD is connected to the first pad 101, the source of the MESD is connected to the second pad 102, and the discharge transistor 300 is suitable for low-level driving. Therefore, the ESD detection unit 100 should output a low-level signal to drive the discharge transistor 300 to be enabled when an ESD event occurs.

In other embodiments, an N-type MOS transistor may also be used as the discharge transistor. In this case, the structure of the ESD detection unit and the structure of the feedback delay unit need to be adjusted accordingly, such that the ESD detection unit outputs a high-level signal to drive the discharge transistor to be enabled.

In this embodiment, the pulse detection unit 100 includes a detection resistor R and a detection capacitor C. One end of the detection resistor R is connected to the first pad 101, and other end of the detection resistor R is connected to the output terminal of the pulse detection unit 100. One end of the detection capacitor C is connected to the second pad 102, and other end of the detection capacitor C is connected to the output terminal of the pulse detection unit 100.

An equivalent resistance of the detection capacitor C will change when the ESD event occurs in the first pad 101 or the second pad 102, which may cause a partial voltage of the detection resistance R to change, thereby triggering a potential change of a point A in FIG. 2. The voltage of the point A is outputted, as the detection result signal, to the feedback delay unit 200 and the discharge transistor 300 to control the feedback delay unit 200 and the discharge transistor 300 to be enabled or disabled.

When there are electrostatic charges accumulated (approximate to VDD) on the first pad 101 and the second pad 102 is grounded (approximate to Vss), the equivalent resistance of the detection capacitor C between the first pad 101 and the second pad 102 will change. At a moment when the electrostatic charges are accumulated, the point A in FIG. 2 is at a low level, and with the continuous discharge of the electrostatic charges, the level of the point A in FIG. 2 will gradually become a high level.

In some embodiments, if the level of the point A meets a threshold voltage of the discharge transistor 300, the source and the drain of the discharge transistor 300 are enabled, and an electrically conductive path is formed between the first pad 101 and the second pad 102 to achieve the discharge of the electrostatic charges on the first pad 101. With the discharge of the electrostatic charges, an equivalent impedance of the detection capacitor C gradually increases, and the level of the point A gradually rises until the discharge transistor 300 is disabled.

When the level of the point A is a low level in a first phase when there are electrostatic charges accumulated on the first pad 101, the PMOS transistor Mp in the feedback delay unit 200 is enabled, and a level of a point B is pulled up to a high level such that the NMOS transistor Mn is enabled. At this moment, the NMOS transistor Mnf is disabled because the level of the point A is the low level. In a second phase when there are electrostatic charges accumulated on the first pad 101, the level of the point A increases due to the equivalent impedance of the detection capacitor C, such that the level of the point A gradually rises, meanwhile the PMOS transistor Mp is gradually disabled, the NMOS transistor Mnf is gradually enabled, and the level of the point B gradually drops from the high level. At this moment, the NMOS transistor Mn gradually changes from an on state to an off state. However, as long as the NMOS transistor Mn is in the on state, an equivalent resistor between the point A and the second pad 102 comprises a turned-on resistor of the NMOS transistor Mn and an equivalent impedor of the detection capacitor C connected in parallel. A resistance obtained after the turned-on resistor of the NMOS transistor Mn and the equivalent impedor of the detection capacitor C are connected in parallel is less than an equivalent resistance of the detection capacitor C. For the point A, a pull-up resistance R remains unchanged throughout the second phase, and a pull-down resistance is the resistance obtained after the above-mentioned parallel connection. Compared with the case where only the detection capacitor C is provided, a pull-down capability becomes stronger in the second phase. Therefore, the on period of the discharge transistor 300 for discharging the electrostatic charges is extended to ensure that the electrostatic charges of the first pad 101 can have enough time to flow to the second pad 102. In this way, the discharge of the electrostatic charges is implemented.

As can be seen from the above analysis, the feedback delay unit 200 can extend the on period of the discharge transistor 300 for discharging the electrostatic charges, such that it is unnecessary to provide a larger capacitor to extend an electrostatic discharge duration of the discharge transistor 300, which occupies less layout space of the integrated circuits, and the electrostatic charges can be discharged more thoroughly.

As can be seen from the above analysis, the product of the resistance of the detection resistor R and the capacitance of the detection capacitor C of the pulse detection unit 100 has a direct effect on the electrostatic discharge duration of the ESD protection circuit during an electrostatic discharge process. The product of the resistance of the detection resistor R and the capacitance of the detection capacitor C of the pulse detection unit 100 is equal to the time constant of the pulse detection unit 100, and the time constant of the pulse detection unit 100 is related to the on period of the discharge transistor 300 for discharging the electrostatic charges. The larger the product of the resistance of the detection resistor R and the capacitance of the detection capacitor C of the pulse detection unit 100 is, the longer the on period of the discharge transistor 300 is, and the more thoroughly the electrostatic charges on the first pad 101 and the second pad 102 are discharged. The feedback delay unit 200 in this embodiment has a pull-down effect on the level of the point A, such that the on period of the discharge transistor 300 for discharging the electrostatic charges may be extended. Therefore, the resistance of the detection resistor R and the capacitance of the detection capacitor C may be appropriately reduced, such that a size of the detection resistor R and a size of the detection capacitor C can be reduced.

In one example, the product of the resistance of the detection resistor R and the capacitance of the detection capacitor C is less than 0.1 us, the capacitance of the detection capacitor C is less than 10 pF, and correspondingly, the resistance of the detection resistor R is less than 10 Kohm. The feedback delay unit 200 may pull down the level of the point A. as a result, the on period of the discharge transistor 300 for discharging the electrostatic charges may be greater than 0.1 μs. In other embodiments, the product of the resistance of the detection resistor R and the capacitance of the detection capacitor C ranges from 0.1 s to 1 us, for example, 0.3 us, 0.5 us, 0.7 us, or 0.9 us.

In this embodiment, the processing unit 400 includes a switch transistor Mnf, wherein a gate of the switch transistor Mnf is connected to the output terminal of the pulse detection unit 100, a source of the switch transistor Mnf is connected to the second pad 102, and a drain of the switch transistor Mnf is connected to the drain of the PMOS transistor Mp. In some embodiments, the switch transistor Mnf is an N-type MOS transistor.

When there are electrostatic charges accumulated on the first pad 101 and the level of the point A is a low level, the switch transistor Mnf is disabled at this moment, and at this moment, the switch transistor Mnf does not have a negative effect on the pull-down effect of the feedback delay unit 200 on the level of the point A. When the level of the point A is a high level, the switch transistor Mnf is enabled, a path is formed between the point B and the second pad 102, and the second pad 102 pulls down the level of the point B to disable the NMOS transistor Mn, such that the feedback delay unit 200 is disabled. In this way, the feedback delay unit 200 is prevented from having a negative effect on normal operation of the first pad 101 and the second pad 102.

It is to be noted that if the pulse detection unit 100 adopts a high-level signal to drive the discharge transistor 300, the switch transistor included in the processing unit 400 also needs to be replaced with a P-type MOS transistor accordingly. In other embodiments, changing the type of the switch transistor may be avoided by additionally providing an inverter on a path connecting the gate of the switch transistor to the pulse detection unit 100.

In the above example, it is described a working principle when static electricity accumulates on the first pad 101. When there is static electricity on the second pad 102, referring to FIG. 3, in this case, the discharge of the electrostatic charges is implemented by means of a parasitic diode D of the discharge transistor 300, which is not analyzed herein.

It is to be noted that when there is static electricity on the second pad 102, the on period of the discharge transistor 300 for discharging the electrostatic charges is at least 0.1 μs, to ensure an electrostatic charge discharge effect of the ESD protection circuit.

The ESD protection circuit provided by this embodiment is simultaneously connected to the first pad 101 and the second pad 102, and thus the ESD protection circuit has a protective effect on functional circuits connected to the first pad 101 and the second pad 102. No matter an ESD event occurs in the first pad 101 or the second pad 102, the ESD protection circuit can achieve a better ESD protection. Therefore, the ESD protection circuit also has a stronger capability of ESD protection.

In this embodiment, the electrostatic charges are discharged by means of the discharge transistor to prevent the functional circuits from being damaged by the electrostatic charges acting on the protected functional circuits. The feedback delay circuit can reduce requirements of the pulse detection unit by means of feedback of extending the on period of the discharge transistor, so that a sufficiently long on period can be ensured without providing a pulse detection unit having a larger time constant. In this way, it is ensured that the electrostatic charges can be discharged thoroughly by ensuring a sufficiently long on period of the discharge transistor when discharging the electrostatic charges. Furthermore, it can be reduced occupation of layout space of the integrated circuit by components in the pulse detection unit. Moreover, the processing unit can avoid falsely triggering the above-mentioned ESD protection function.

It is worth mentioning that each unit involved in this embodiment is a logical unit. In practical applications, one logical unit may be one physical unit, or may be a part of one physical unit, or may be realized by a combination of a plurality of physical units. In addition, to highlight the innovation part of the present disclosure, in this embodiment, no unit not closely related to solving the technical problems put forward in the present disclosure is introduced, however, this does not mean that no other units exist in this embodiment.

Another embodiment of the present disclosure relates to an integrated circuit, comprising the ESD protection circuit in the foregoing embodiment, wherein the ESD protection circuit is configured to discharge the electrostatic charges for a pad on the integrated circuit.

In this embodiment, the integrated circuit can protect the functional circuit from electrostatic damage. Furthermore, the ESD protection circuit has the feedback delay circuit, which can extend an electrostatic discharge duration and ensure that the static electricity on the pad can be completely discharged as much as possible. Therefore, the protective effect of the ESD protection circuit is ensured, and an anti-electrostatic capability of the integrated circuit is improved.

The foregoing embodiment and this embodiment correspond to each other, and thus this embodiment can be implemented in coordination with the foregoing embodiment. Relevant technical details as mentioned in the foregoing embodiment are still effective in this embodiment, and the technical effects that can be achieved in the foregoing embodiment can also be implemented in this embodiment, which is not repeated anymore herein to reduce repetition. Correspondingly, the relevant technical details as mentioned in this embodiment may be also applied to the foregoing embodiment.

Still another embodiment of the present disclosure relates to an electrostatic discharge method, which is configured for electrostatic discharge by means of the ESD protection circuit in the foregoing embodiment. The electrostatic discharge method includes following steps: providing a discharge transistor, the discharge transistor being respectively connected to a first region and a second region in need of ESD protection; controlling the discharge transistor to be enabled when a surface of the first region and a surface of the second region have an electrostatic charge; and controlling the discharge transistor to be disabled when there is no need for electrostatic discharge.

FIG. 4 is a schematic flow diagram of steps of the electrostatic discharge method according to this embodiment. The electrostatic discharge method provided by this embodiment will be described in detail below with reference to the accompanying drawings, and the same or corresponding portions as the foregoing embodiment will not be described in detail below.

Referring to FIG. 4, the electrostatic discharge method provided in this embodiment includes the following steps.

Step 201: providing a discharge transistor, the discharge transistor being respectively connected to a first region and a second region in need of electrostatic discharge protection.

Step 202: controlling the discharge transistor to be enabled when a surface of the first region and a surface of the second region have an electrostatic charge.

In some embodiments, a sufficiently long on period of the discharge transistor may be set to ensure that the electrostatic charges in the first region can be thoroughly discharged, to prevent the functional circuits connected to the first region and the second region from being adversely affected by the electrostatic charges not discharged thoroughly. The discharge transistor is connected to a pulse detection unit, the pulse detection unit is connected to a feedback delay unit, and the detection result signal is jointly controlled by the pulse detection unit and the feedback delay unit, to ensure the on period of the discharge transistor.

In one example, a preset duration is greater than 0.1 μs, and thus the on period of the discharge transistor discharging the electrostatic charges is at least 0.1 μs.

Step 203: controlling the discharge transistor to be disabled when there is no need for electrostatic discharge.

In some embodiments, the discharge transistor is controlled to be disabled when there is no need for electrostatic discharge, such that when there is no electrostatic charge to be discharged on the surface of the first region and the surface of the second region, the functional circuits connected to the first region and the second region can work normally.

In this embodiment, it is ensured that the electrostatic charges are discharged thoroughly by ensuring a sufficiently long duration of discharging the electrostatic charges, to prevent the functional circuits from being damaged by the electrostatic charges acting on the protected functional circuits.

The division of the above various steps is merely for clarity of description. When implemented, these steps may be combined into one step or some steps may be split into a plurality of steps, which falls within the scope of protection of this patent as long as they include the same logical relationship. Adding insignificant modifications or introducing insignificant designs to processes without changing the core design of the processes are all within the scope of protection of the patent.

The foregoing embodiment and this embodiment correspond to each other, and thus this embodiment can be implemented in coordination with the foregoing embodiment. Relevant technical details as mentioned in the foregoing embodiment are still effective in this embodiment, and the technical effects that can be achieved in the foregoing embodiment can also be implemented in this embodiment, which is not repeated anymore herein to reduce repetition. Correspondingly, the relevant technical details as mentioned in this embodiment may be also applied to the foregoing embodiment.

Those of ordinary skill in the art can understand that the above-mentioned embodiments are some embodiments for realizing the present disclosure, but in practical applications, various changes can be made to them in form and details without departing from the spirit and scope of the present disclosure.

What is claimed is:

1. An electrostatic discharge (ESD) protection circuit, comprising:
   a pulse detection unit configured to detect an electrostatic pulse, a first terminal of the pulse detection unit being connected to a first pad, a second terminal of the pulse detection unit being connected to a second pad, and an output terminal of the pulse detection unit being configured to output a detection result signal;
   a discharge transistor, a gate of the discharge transistor being connected to the output terminal of the pulse detection unit, a drain of the discharge transistor being connected to the first pad, a source of the discharge transistor being connected to the second pad, and the discharge transistor being configured to discharge an electrostatic charge when an ESD event occurs in the first pad or the second pad;
   a feedback delay unit, configured to extend an on period of the discharge transistor when the discharge transistor discharges the electrostatic charge; wherein the feedback delay unit comprises: a P-channel metal oxide semiconductor (PMOS) transistor, a source of the PMOS transistor being connected to the first pad, and a gate of the PMOS transistor being connected to the output terminal of the pulse detection unit; and an N-channel metal oxide semiconductor (NMOS) transistor, a source of the NMOS transistor being connected to the second pad, a drain of the NMOS transistor being connected to the output terminal of the pulse detection unit, and a gate of the NMOS transistor being connected to a drain of the PMOS transistor; and
   a processing unit, respectively connected to the output terminal of the pulse detection unit and the feedback delay unit, the processing unit being configured to control ON and OFF of the feedback delay unit according to the detection result signal;
   wherein the ESD protection circuit is configured to discharge static electricity for a pad on an integrated circuit.

2. The ESD protection circuit according to claim 1, wherein the processing unit comprises: a switch transistor, a gate of the switch transistor being connected to the output terminal of the pulse detection unit, a source of the switch transistor being connected to the second pad, and a drain of the switch transistor being connected to the drain of the PMOS transistor.

3. The ESD protection circuit according to claim 2, wherein the switch transistor is an N-type metal oxide semiconductor (MOS) transistor.

4. The ESD protection circuit according to claim 1, wherein the discharge transistor is a P-type MOS transistor.

5. The ESD protection circuit according to claim 4, wherein the gate of the discharge transistor being connected to the output terminal of the pulse detection unit, the drain of the discharge transistor being connected to the first pad, and the source of the discharge transistor being connected to the second pad.

6. The ESD protection circuit according to claim 1, wherein the pulse detection unit comprises:
   a detection resistor, a terminal of the detection resistor being connected to the first pad, and another terminal of the detection resistor being connected to the output terminal of the pulse detection unit; and
   a detection capacitor, a terminal of the detection capacitor being connected to the second pad, and another terminal of the detection capacitor being connected to the output terminal of the pulse detection unit.

7. The ESD protection circuit according to claim 6, wherein a product of a resistance of the detection resistor and a capacitance of the detection capacitor is equal to a time constant of the pulse detection unit.

8. The ESD protection circuit according to claim 6, wherein a product of a resistance of the detection resistor and a capacitance of the detection capacitor is less than 0.1 us.

9. The ESD protection circuit according to claim 8, wherein the capacitance of the detection capacitor is less than 10 pF.

10. The ESD protection circuit according to claim 8, wherein the resistance of the detection resistor is less than 10 Kohm.

11. The ESD protection circuit according to claim 1, wherein the on period of the discharge transistor when the discharge transistor discharges the electrostatic charge is greater than 0.1 μs.

12. An integrated circuit comprising an electrostatic discharge (ESD) protection circuit, wherein the ESD protection circuit comprises:
    a pulse detection unit configured to detect an electrostatic pulse, a first terminal of the pulse detection unit being connected to a first pad, a second terminal of the pulse detection unit being connected to a second pad, and an output terminal of the pulse detection unit being configured to output a detection result signal;
    a discharge transistor, a gate of the discharge transistor being connected to the output terminal of the pulse detection unit, a drain of the discharge transistor being connected to the first pad, a source of the discharge transistor being connected to the second pad, and the discharge transistor being configured to discharge an electrostatic charge when an ESD event occurs in the first pad or the second pad;
    a feedback delay unit, configured to extend an on period of the discharge transistor when the discharge transistor discharges the electrostatic charge; wherein the feedback delay unit comprises: a P-channel metal oxide semiconductor (PMOS) transistor, a source of the PMOS transistor being connected to the first pad, and a gate of the PMOS transistor being connected to the output terminal of the pulse detection unit; and an N-channel metal oxide semiconductor (NMOS) transistor, a source of the NMOS transistor being connected to the second pad, a drain of the NMOS transistor being connected to the output terminal of the pulse detection unit, and a gate of the NMOS transistor being connected to a drain of the PMOS transistor;
    and
    a processing unit, respectively connected to the output terminal of the pulse detection unit and the feedback delay unit, the processing unit being configured to control ON and OFF of the feedback delay unit according to the detection result signal;
    wherein the ESD protection circuit is configured to discharge static electricity for a pad on the integrated circuit.

13. An electrostatic discharge method configured for electrostatic discharge by means of an electrostatic discharge (ESD) protection circuit, wherein the ESD protection circuit comprises:
    a pulse detection unit configured to detect an electrostatic pulse, a first terminal of the pulse detection unit being connected to a first pad, a second terminal of the pulse detection unit being connected to a second pad, and an output terminal of the pulse detection unit being configured to output a detection result signal;

a discharge transistor, a gate of the discharge transistor being connected to the output terminal of the pulse detection unit, a drain of the discharge transistor being connected to the first pad, a source of the discharge transistor being connected to the second pad, and the discharge transistor being configured to discharge an electrostatic charge when an ESD event occurs in the first pad or the second pad;

a feedback delay unit, configured to extend an on period of the discharge transistor when the discharge transistor discharges the electrostatic charge; wherein the feedback delay unit comprises: a P-channel metal oxide semiconductor (PMOS) transistor, a source of the PMOS transistor being connected to the first pad, and a gate of the PMOS transistor being connected to the output terminal of the pulse detection unit; and an N-channel metal oxide semiconductor (NMOS) transistor, a source of the NMOS transistor being connected to the second pad, a drain of the NMOS transistor being connected to the output terminal of the pulse detection unit, and a gate of the NMOS transistor being connected to a drain of the PMOS transistor; and a processing unit, respectively connected to the output terminal of the pulse detection unit and the feedback delay unit, the processing unit being configured to control ON and OFF of the feedback delay unit according to the detection result signal;

wherein the electrostatic discharge method comprises:

providing a discharge transistor, the discharge transistor being respectively connected to a first region and a second region in need of electrostatic discharge protection;

controlling the discharge transistor to be enabled when a surface of the first region and a surface of the second region have an electrostatic charge; and controlling the discharge transistor to be disabled when there is no need for electrostatic discharge.

14. The electrostatic discharge method according to claim 13, wherein the controlling the discharge transistor to be enabled when a surface of the first region and a surface of the second region have an electrostatic charge comprises:

enabling the discharge transistor based on a detection result signal;

wherein the discharge transistor is connected to a pulse detection unit, the pulse detection unit being connected to a feedback delay unit, and the detection result signal being jointly controlled by the pulse detection unit and the feedback delay unit.

15. The electrostatic discharge method according to claim 13, wherein the on period of the discharge transistor is at least 0.1 µs.

* * * * *